Dec. 8, 1953      G. B. SMITH      2,661,941
SELECTIVE SPEED CONTROL FOR MOTOR VEHICLES
Filed June 14, 1950      3 Sheets-Sheet 1
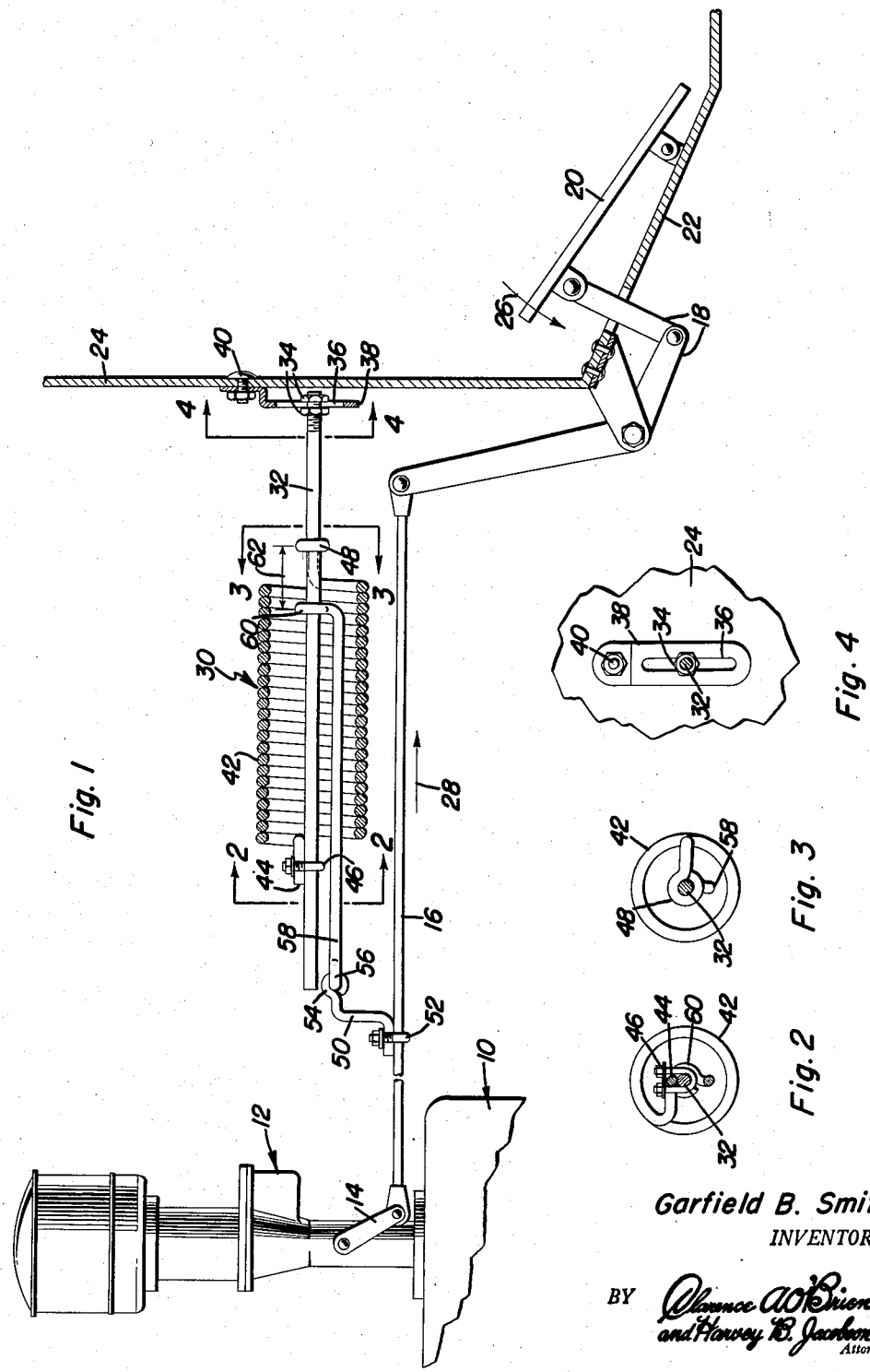
Garfield B. Smith
INVENTOR.

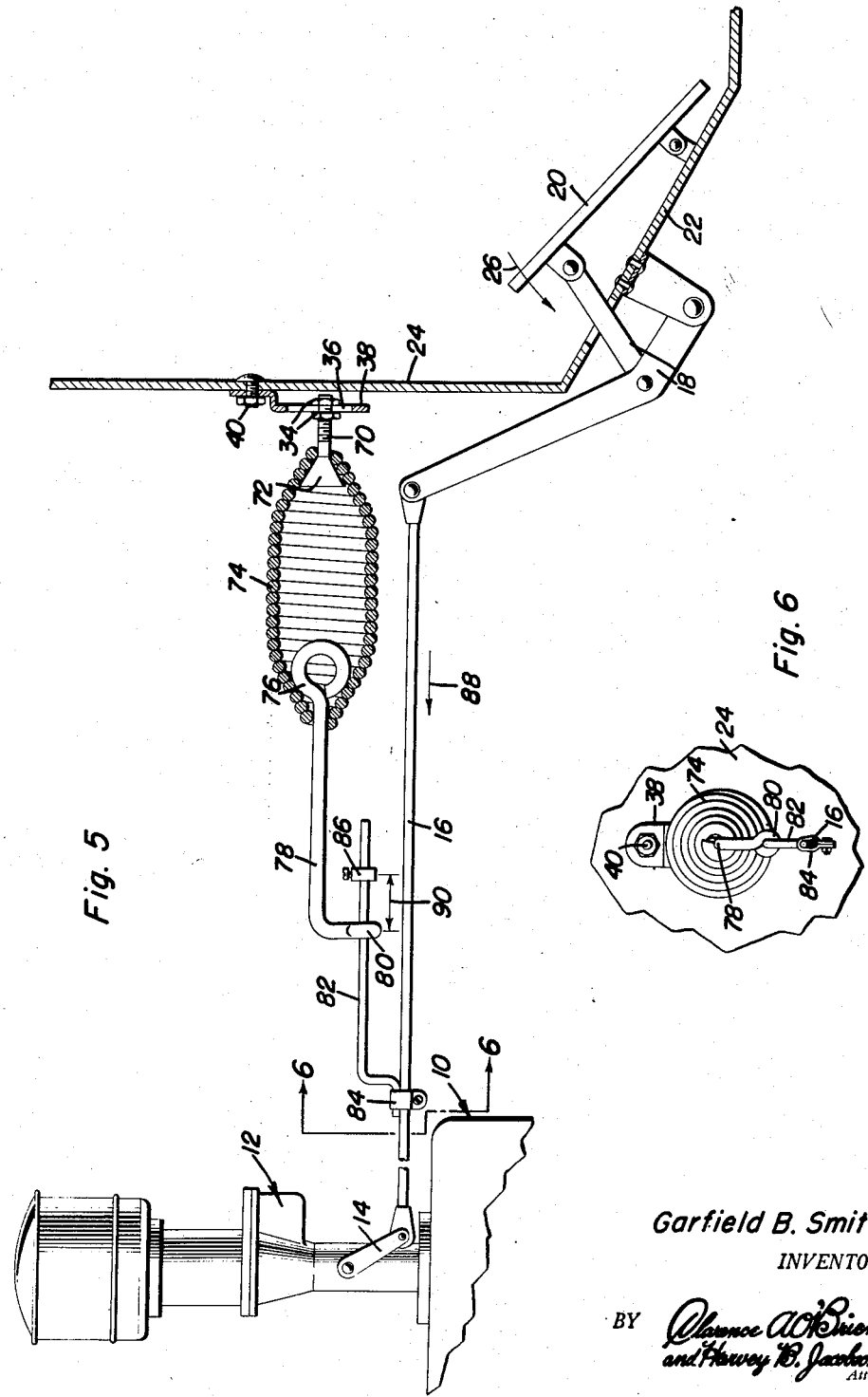
Dec. 8, 1953 — G. B. SMITH — 2,661,941
SELECTIVE SPEED CONTROL FOR MOTOR VEHICLES
Filed June 14, 1950 — 3 Sheets-Sheet 2
Garfield B. Smith
INVENTOR.

Dec. 8, 1953    G. B. SMITH    2,661,941
SELECTIVE SPEED CONTROL FOR MOTOR VEHICLES
Filed June 14, 1950    3 Sheets-Sheet 3
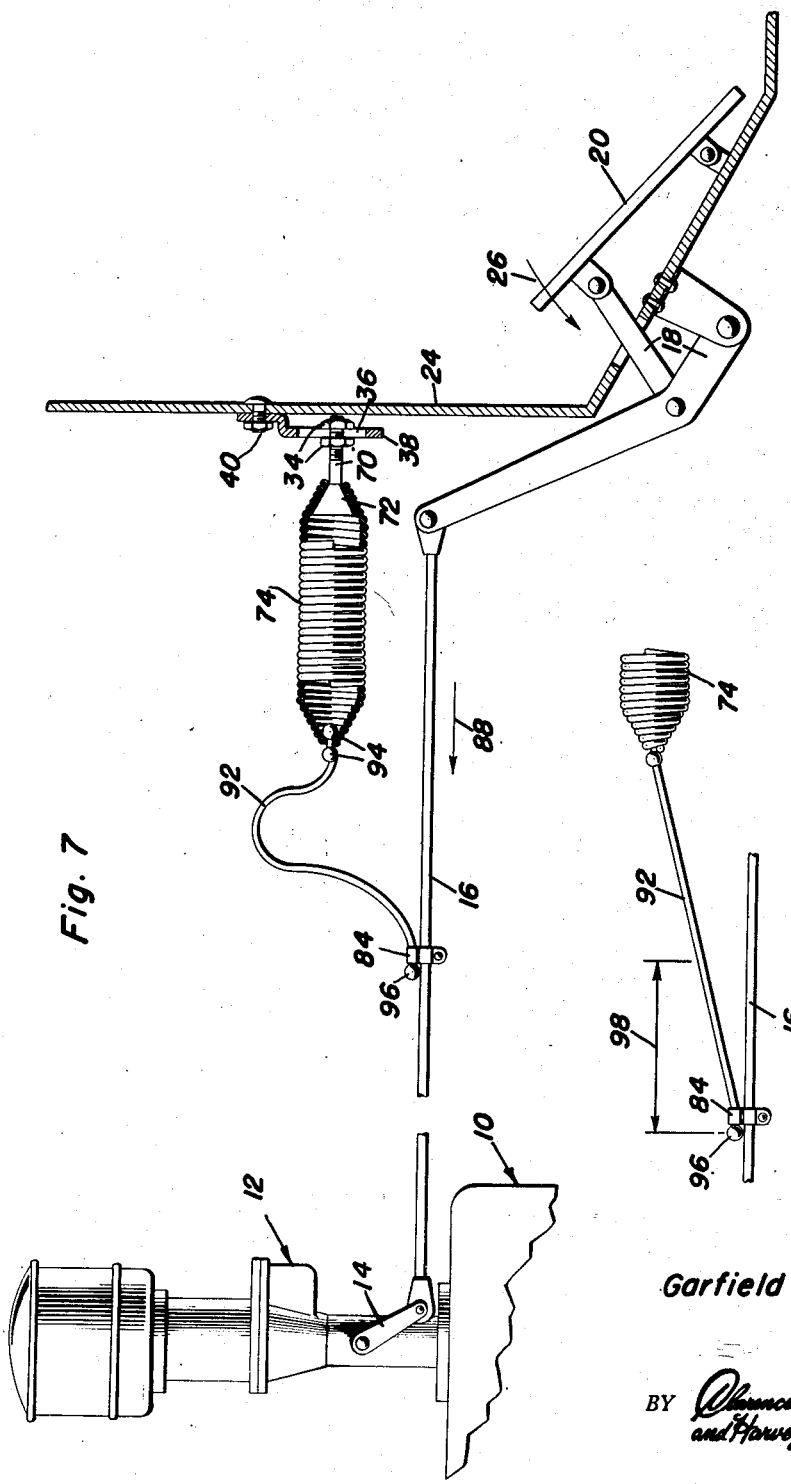
Garfield B. Smith
INVENTOR.

Patented Dec. 8, 1953

2,661,941

UNITED STATES PATENT OFFICE 2,661,941

SELECTIVE SPEED CONTROL FOR MOTOR VEHICLES

Garfield B. Smith, Hazel Park, Mich.

Application June 14, 1950, Serial No. 167,993

2 Claims. (Cl. 267—1)

This invention relates to new and useful improvements and structural refinements in speed controls for motor vehicles having internal combustion engines, and the principal object of the invention is to enable the driver of such a vehicle to recognize the exact moment at which the vehicle has reached a predetermined speed, whereby the vehicle may be easily and efficiently controlled so as to sustain that speed, particularly while travelling over considerable distances.

An important feature of the invention resides in the provision of means for permitting the vehicle to be accelerated beyond the predetermined speed, such as for example, in an emergency, this being possible by simply depressing the accelerator pedal beyond the limit which is required for sustaining the speed of the vehicle at the predetermined rate.

Another feature of the invention resides in the provision of means for adjusting the control so as to vary the rate of speed at which the invention becomes operative.

Some of the advantages of the invention reside in its simplicity of construction, in its efficient and dependable operation, and in its adaptability for use on vehicles of different types.

With the above more important objects and features in view and such other objects and features as may become apparent as this specification proceeds, the invention consists essentially in the construction and arrangement of parts as shown in the accompanying drawings, in which:

Figure 1 is a fragmentary sectional view showing the invention in combination with a vehicle;

Figure 2 is a sectional detail, taken substantially in the plane of the line 2—2 in Figure 1;

Figure 3 is a sectional detail, taken substantially in the plane of the line 3—3 in Figure 1;

Figure 4 is a sectional detail, taken substantially in the plane of the line 4—4 in Figure 1;

Figure 5 is a fragmentary sectional view illustrating a modified embodiment of the invention in combination with a vehicle;

Figure 6 is a fragmentary sectional view, taken substantially in the plane of the line 6—6 in Figure 5;

Figure 7 is a fragmentary sectional view showing a further modified embodiment of the invention in combination with a vehicle; and Figure 8 is a fragmentary elevational view of the embodiment of Figure 7 in its operative position.

Like characters of reference are employed to designate like parts in the specification and throughout the several views.

Referring now to the accompanying drawings in detail, more particularly to Figures 1-4, inclusive, the general reference character 10 designates an internal combustion engine of a vehicle such as an automobile, the engine 10 including a carburetor 12 having a throttle valve (not shown) operated by a crank 14 which, in turn, is operatively connected by a longitudinally shiftable accelerator rod 16 and by suitable linkage 18 to a depressible accelerator pedal 20, as will be clearly apparent. The pedal 20 is mounted on the usual floor board 22 provided at the lower edge of a fire wall 24 which customarily separates the engine compartment from the body of the vehicle.

It will be apparent from the foregoing that when the pedal 20 is depressed in the direction of the arrow 26, the rod 16 is shifted, as at 28, so as to open the throttle valve of the carburetor 12 and increase the speed of the engine 10.

The invention resides in the provision of a speed control which is designated generally by the reference character 30 and includes in its construction a supporting bar 32 which is substantially parallel to the rod 16 and has a screw-threaded end portion secured by suitable lock nuts 34 in a vertical slot 36 provided in an offset bracket 38. This bracket is secured to the fire wall 24 by one of the several bolts or screws 40 with which the fire wall is usually equipped.

By virtue of the slot 36, the supporting bar 32 may be adjusted vertically so as to vary its spacing from the rod 16 and a helical tension spring 42 has one end portion 44 thereof secured by a suitable clamp 46 to the bar 32 so that the spring is coaxial with the bar, as shown.

The remaining end portion of the spring 42 is arcuated so as to provide an eye or loop 48 which is slidable longitudinally on the bar 32, that is, slidable to the right from the position shown in Figure 1.

An angulated rod 50 is secured by a clamp 52 to an intermediate portion of the accelerator rod 16 and is provided with an eye 54 which movably engages a further eye 56 at one end of a link 58.

The link 58 extends longitudinally in the spring 42 and terminates at its free end in an eye-shaped detent 60 which is also slidable on the supporting bar 32 and is engageable with the eye 48 of the spring 42, as will presently be explained.

When the engine 10 is idling or when it is stopped, the detent 60 is spaced away from the eye 48 as indicated at 62 in Figure 1, but when the accelerator 20 is depressed and the accelerator rod 16 is shifted in the direction of the arrow 28 so as to increase the speed of the engine, the distance between the detent 60 and the eye 48 will be decreased until the detent engages the eye. At that point, a predetermined rate of speed will be reached, and if it is desired to increase the rate beyond that speed, the detent 60, travelling with the rod 16, will push the eye 48 toward the bulkhead 24, thus stretching the spring 42. In this manner, the operator of the vehicle will be able to "feel" when a predetermined speed has been reached, but nevertheless a higher speed may be obtained in an emergency by simply depressing the pedal 20 to a greater extent while stretching the spring 42.

The rate of speed at which the detent 60 comes into engagement with the eye 48 may be varied by either loosening the clamp 46 and sliding the entire spring 42 along the supporting bar 32 or, alternatively, by loosening the clamp 52 and sliding the rod 50 together with the link 58 along the rod 16.

Referring now to the modified embodiment of the invention illustrated in the accompanying Figure 5, the slotted bracket 38 which is attached to the fire wall 24 is provided with a screw-threaded supporting member 70 having a frusto-conical head 72 seated in a complemental, frusto-conical end portion of a coiled tension spring 74, while the remaining, similarly configured end portion of the spring affords a seat for an enlarged portion or eye 76 at one end of an extension rod 78 with which the spring 74 is equipped.

The free end portion of this rod 78 terminates in an eye 80 in which is slidable a link 82, the latter being secured to the accelerator rod 16 by a clamp 84, while a collar 86 is adjustably mounted on the link, as shown.

When the accelerator pedal 20 is depressed, as at 26, the accelerator rod 16 is shifted in the direction of the arrow 88 until the space 90 existing between the eye 80 and the collar 86 is taken up when a predetermined rate of speed has been reached. Thereupon, the collar 86 will slide the rod 78 in the direction of the arrow 88, thus stretching the spring 74.

The rate of speed at which this embodiment of the invention becomes operative may be adjusted by either shifting the position of the collar 86 on the link 82 or, alternatively, by loosening the clamp 84 and shifting the position of the link 82 relative to the rod 16.

In the further modified embodiment of the invention which is illustrated in Figures 7 and 8 and is similar to the embodiment of Figures 5 and 6, the components 78, 80, 82, and 86 are substituted by a flexible connecting element such as a length of cord or cable 92, one end portion of which is inserted in the free frusto-conical end portion of the spring 74 and is anchored therein by a pair of stops or collars 94 which are affixed to the cord. The other end of the cord or cable 92 is secured by the clamp 84 to the rod 16 and a further stop or collar 96 is secured to the end of the cord to prevent the same from being withdrawn from the clamp.

The cord 92 is sufficiently long to be substantially slack when the engine is idling or is accelerated to a certain predetermined speed. At that point, the cord becomes taut and commences to stretch the spring 74, thus offering resistance to further acceleration.

The distance which the rod 16 is permitted to travel before stretching the spring is indicated at 98, and may be preadjusted by simply varying the position of the clamp 84 on the rod.

It is believed that the advantages and use of the invention will be clearly understood from the foregoing disclosure and, accordingly, further description thereof at this point is deemed unnecessary.

Having described the invention, what is claimed as new is:

1. A speed control for engines, comprising a stationary rod, a coil spring coaxial with but spaced from said rod, means securing one end of the spring to the rod, an eye provided at the other end of the spring and slidable on the rod, a link parallel to the rod and having one end portion disposed in said spring, a loop provided on said one end of said link and slidable on said rod in and out of abutment with said eye, the other end portion of said link projecting outwardly from said spring, and means at the outer end of the link for operatively connecting the same to a speed controlling element of an engine.

2. The device as defined in claim 1 together with a mounting bracket provided with a slot, said rod having a screw-threaded end portion extending through said slot, and a pair of lock-nuts provided on the threaded portion of the rod at the opposite sides of said bracket.

GARFIELD B. SMITH.

References Cited in the file of this patent

UNITED STATES PATENTS

| Number | Name | Date |
|---|---|---|
| 1,720,561 | Maier et al. | July 9, 1929 |
| 2,077,555 | Frantz | Apr. 20, 1937 |
| 2,104,649 | Hinton | Jan. 4, 1938 |
| 2,474,232 | Dach | June 28, 1949 |

FOREIGN PATENTS

| Number | Country | Date |
|---|---|---|
| 60,632 | Denmark | Feb. 22, 1943 |